United States Patent [19]

MacGregor

[11] Patent Number: 5,406,644
[45] Date of Patent: Apr. 11, 1995

[54] APPARATUS AND METHOD FOR EMULATING A COMPUTER INSTRUCTION SET USING A JUMP TABLE IN THE HOST COMPUTER

[75] Inventor: Roderick MacGregor, Bucks, England

[73] Assignee: Insignia Solutions, Inc., High Wycombe, United Kingdom

[21] Appl. No.: 276,421

[22] Filed: Nov. 23, 1988

[51] Int. Cl.[6] .............. G06F 9/06; G06F 9/30; G06F 9/22; G06F 12/10

[52] U.S. Cl. ............................ 395/500; 364/228; 364/231.9; 364/232; 364/232.23; 364/232.3; 364/244.6; 364/244.9; 364/245.1; 364/245.9; 364/246.5; 364/247.6; 364/246.92; 364/252.3; 364/255.7; 364/255.8; 364/256.4; 364/256.6; 364/259.9; 364/262.8; 364/262.81; 364/262.9; 364/263.3; 364/265.2; 364/DIG. 1; 364/DIG. 2

[58] Field of Search ... 364/200 MS File, 900 MS File, 364/300, DIG. 1, DIG. 2; 395/500, 425, 325, 400, 275, 800, 375, 650, 775, 700, 575, 550, 725

[56] References Cited

U.S. PATENT DOCUMENTS

| | | | |
|---|---|---|---|
| 4,181,934 | 1/1980 | Marehim | 364/200 |
| 4,378,589 | 5/1983 | Finnegan et al. | 364/200 |
| 4,453,211 | 6/1984 | Askinazi et al. | 395/500 |
| 4,514,805 | 4/1985 | McDonough et al. | 364/200 |
| 4,547,849 | 10/1985 | Louie et al. | 395/325 |
| 4,631,659 | 12/1986 | Hayn, II et al. | 364/200 |
| 4,635,188 | 1/1987 | Williamson et al. | 364/200 |
| 4,639,865 | 1/1987 | Martin | 364/200 |
| 4,791,557 | 12/1988 | Angel et al. | 364/200 |
| 4,812,975 | 3/1989 | Adachi et al. | 364/300 |
| 4,926,322 | 5/1990 | Stimac et al. | 395/500 |
| 4,992,934 | 2/1991 | Portanova et al. | 395/500 |

OTHER PUBLICATIONS

"Structured Computer Organization" 2nd edition Andrew S. Tannenbaum, Prentice-Hall, Inc. 1984 pp. 148-163.

*Primary Examiner*—Thomas C. Lee
*Assistant Examiner*—Daniel H. Pan
*Attorney, Agent, or Firm*—Wolf, Greenfield & Sacks

[57] ABSTRACT

Data processing means adapted to be controlled by sequential instructions, a substantial number of which comprise an operation code selected from a set of n such codes and a qualifying code selected from a set of m such codes, the data processing means comprising a store having approximately n times m locations with each location corresponding to a consistent combination of operating code and qualifying code and holding a series of instructions corresponding to the said operating code and qualifying code. The qualifying code may be the addressing mode and a jump table of 256×256 entries may be employed to access the instruction series.

22 Claims, 31 Drawing Sheets

```
Pop Word ea(m0/rm0)

.globl _08fA00
_08fA00: movw d6,d4; addw _SI,d4| BX+SI
    movl a6,a0; addl d4,a0 | add seg offset to ea
    movl a1,d5; movw a2@(d5:1),a0@ | pop a word on the stack
    addqw #2,d5;  movl d5,a1  | increment the stack pointer
    addql #2,a5|  inc opcode and return
    cmpl _gvi_low_regen,a0; bgel video_word_routine
;   movw a5@,d4; jra a4@(d4:1:4)@

Pop Word ea(m1/rm0)

.globl _08fA40
_08fA40: movb a5@(2),d4; extw d4; addw d6,d4; addw _SI,d4 | BX+SI
    movl a6,a0; addl d4,a0 | add seg offset to ea
    movl a1,d5; movw a2@(d5:1),a0@ | pop a word on the stack
    addqw #2,d5;  movl d5,a1  | increment the stack pointer
    addql #3,a5  | inc opcode and return
    cmpl _gvi_low_regen, a0; bgel video_word_routine
;   movw a5@,d4; jra a4@(d4:1:4)@
```

Fig. 2A.1

```
Pop Word ea(m2/rm0)

.globl _08fA80
_08fA80: movw a5@(2),d4; rolw #8,d4 ; addw d6,d4; addw _SI,d4 | BX+SI
    movl a6,a0; addl d4,a0 | add seg offset to ea
    movl a1,d5; movw a2@(d5:1),a0 | pop a word on the stack
    addqw #2,d5; movl d5,a1 | increment the stack pointer
    addql #4,a5 | inc opcode and return
    cmpl _gvi_low_regen,a0; bgel video_word_routine
    ;movw a5@,d4; jra a4@(d4:1:4)@

Pop Word reg (BX)

.globl _05bA00
_05bA00:
    movl a1,d5; movw a2@(d5:1),d6 | pop a word on the stack
    rolw #8,d6 | flip the bytes
    addqw #2,d5; movl d5,a1 | increment the stack pointer
    addql #1,a5 | inc opcode and return
    ; movw a5@,d4; jra a4@(d4:1:4)@
```

Fig. 2A.2

Pop Word reg (BX)

```
.globl _05bA58
_05bA58:
    movl a1,d5; movw a2@(d5:1),d6 | pop a word on the stack
    rolw #8,d6 | flip the bytes
    addqw #2,d5 | increment the stack pointer
    movw a2@(d5:1),d7 | pop a word on the stack
    rolw #8,d7 | flip the bytes
    addqw #2,d5; movl d5,a1 | increment the stack pointer
    addqw #2,a5 | inc opcode and return
;   movw a5@,d4; jra a4@(d4:1:4)@
```

Fig. 2A.3

```
.globl _0Ø1AØØ
_0Ø1AØØ: movw d6,d4 addw _SI,d4 | BX+SI
    movw d7,dØ | get word from register
    movl a6,aØ; addl d4,aØ | add seg offset to ea
    movw aØ@,d1; rolw #8,d1 | get word from memory
    movw d1,d2; addw dØ,d2; movw cc,d3 | ADD
    movw d2,d4; rolw #8,d4; movw d4,aØ@ | store word in memory
    addql #2,a5 | inc opcode and return
    cmpl _gvi_low_regen,aØ; bgel video_word_routine
;   movw a5@,d4; jra a4@(d4:1:4)@
```

Fig. 2B

```
*GENERATED by gen jump2*
    .globl _07aA00
_07aA00:
_JP,JPE
    moveq #0,d4; movb d2,d4; movl #_pf_table,a0; movb a0@(d4:w),d4
    btst #0,d4
    bne 10$
    addql #2,a5      | inc opcode and return
;   movw a5@,d4; jra a4@(d4:1:4)@
10$:
    movb a5@(1),d4
    extbl d4         | d4 = sign extended disp
    addl d4,a5       | compute new opcode pointer
    moveq #0,d4      | we must keep top half clear.
    addql #2,a5      | inc opcode and return
;   movw a5@,d4; jra a4@(d4:1:4)@

```
#! /bin/sh _v

# SccsID = @(#)make_pop 2.4 12/24/86 Copyright Insignia Solution Ltd.

cat gen_pop | pp > /tmp/gen_pop.$$
echo 'TYPE EA' | awk -f /tmp/gen_pop.$$ | /lib/cpp -P -I. | sed -n -e '/^$/!p' > action_8f.s

echo 'TYPE REG' > /tmp/t0.$$
echo 'PID' $$ >> /tmp/t0.$$
cat /tmp/t0.$$ | awk -f /tmp/gen_pop.$$
/lib/cpp -P -I. /tmp/58.$$ | sed -n -e '/^$/!p' > action_58.s
/lib/cpp -P -I. /tmp/59.$$ | sed -n -e '/^$/!p' > action_59.s
/lib/cpp -P -I. /tmp/5a.$$ | sed -n -e '/^$/!p' > action_5a.s
/lib/cpp -P -I. /tmp/5b.$$ | sed -n -e '/^$/!p' > action_5b.s
/lib/cpp -P -I. /tmp/5c.$$ | sed -n -e '/^$/!p' > action_5c.s
/lib/cpp -P -I. /tmp/5d.$$ | sed -n -e '/^$/!p' > action_5d.s
/lib/cpp -P -I. /tmp/5e.$$ | sed -n -e '/^$/!p' > action_5e.s
/lib/cpp -P -I. /tmp/5f.$$ | sed -n -e '/^$/!p' > action_5f.s

echo 'TYPE SEG REG' > /tmp/t0.$$
echo 'PID' $$ >> /tmp/t0.$$
cat /tmp/t0.$$ | awk -f /tmp/gen_pop.$$
/lib/cpp -P -I. /tmp/07.$$ | sed -n -e '/^$/!p' > action_07.s
/lib/cpp -P -I. /tmp/0f.$$ | sed -n -e '/^$/!p' > action_0f.s
/lib/cpp -P -I. /tmp/17.$$ | sed -n -e '/^$/!p' > action_17.s
/lib/cpp -P -I. /tmp/1f.$$ | sed -n -e '/^$/!p' > action_1f.s
rm /tmp/*.$$
```

Fig. 3

```

# SccsID = @(#)gen_pop 2.7 12.24/86 Copyright Insignia Solutions Ltd.

BEGIN {
    inst_type = ""
    pid = ""
}
/TYPE/ { inst_type = $2 }
/PID/  { pid = $2 }
END {

#I hex
I reg table [0]  = 88
table [1]  = 89
table [2]  = 90
table [3]  = 91
table [4]  = 92
table [5]  = 93
table [6]  = 94
table [7]  = 95
table [8]  = 7
table [9]  = 23
table [10] = 31
table [11] = 0
```

Fig. 8A

```

# constants

    sp = 4      # the stack pointer reg code (3 bit)
    cs = 1      # the code segment register if ( inst_type == "" ) {
        print "TYPE must be given"
        exit
    } if ( inst_type == "EA") { print "#include\"mac_reg\""
    print "#include\"mac_addr\""
    print "#include\"mac_util\""
    print "#include\"mac_pop\""

for (irm = 0; irm < 8; irm++) {
        for (imode =0; imode < 3; imode++) {
```

Fig. 8B

```
#print out header comment
print " "
print "|"
print "| Pop Word ea ("mod[imode] "/" rm[irm] ")"
print "|"

print out label and the addressing macro
j = 64 * imode + irm
print ".globl _O" hex [143] "A" hex[j]
print "_O" hex [143] "A" hex[j] ": " mod[imode] rm[irm]

#print out the segment offset macro
if ( irm == 2 || irm == 3 || (imode ! = 0 && irm == 6))
        print "segmentss"
else
        print "segmentds"

#pop the word on the stack
print "pop_word (" DEST ")"

#increment the stack pointer
print "inc_stack_pointer"

#test for the special case of a disp only so
#that we get the immediate data from the correct place
if ( imode == 0 && irm == 6 )
        print "end4"
else
        print finish[imode]

#print out the regen check macro
print "video_word"

print "end0"
```

Fig. 8C

```
# mode 3 addressing .
# direct reference to registers
imode = 3
for (irm = 0; irm < 8: irm ++) { print out a header comment
        print " "
        print "|"
        print "| Pop Word ea ("mod[imode] "/" rm[irm] ")"
        print "|"

print out label and the addressing macro
        j = 64 * imode = irm
        print ".globl _O" hex[143] "A" hex [j]
        print "_O" hex[143] "A" hex [j] ":"

# pop a word
        print "pop_word(" EADDR ")"
        print "swap_word(" EADDR ")"

# the stack pointer is a special case
        if(irm == sp) {
                print "put_sp(" EADDR ")"
        }
        else {
                # increment the stack pointer
                print "inc_stack_pointer"
                print "move_word(" EADDR "," reg[irm] ")"
        } print out the finish macro
        print "end2"
        print "end0"
}
exit
```

Fig. 8D

```
if ( inst_type == "REG") { cyle round for the 3 bit register field
    for (i=0; i<8; i++) { calculate the first byte value for
            # 0b01010xxx -> 0x58 + (3 bit from i)
            val = 88 + i set the output filename
            filename = "/tmp/" hex[val] "." pid print "#include /"mac_reg\""> filename
            print "#include /"mac_addr\"" > filename
            print "#include /"mac_util\"" >> filename
            print "#include /"mac_pop\"" >> filename
            print "#include /"mac_seg\"" >> filename
            print "#include /"mac_int\"" >> filename
```

Fig. 8E

```
# print out a header comment
print " " >> filename
print "|" >> filename
print "|  Pop Word reg(" comreg[i] ")" >> filename
print "|" >> filename print out the label
print ".globl _∅" hex[val] "A∅∅" >> filename
print "_∅" hex[val] "A∅∅: " >> filename the stack pointer is a special case
if(i == sp) {
        print "pop_word(" EADDR ")" >> filename
        print "swap_word(" EADDR ")" >> filename
        print "put_sp (" EADDR ")" >> filename
}
# Special case for Motorola data registers
else if ( typewreg[i] == "data" ) {
        print "pop_word(" reg[i] ")" >> filename
        print "swap_word(" reg[i] ")" >> filename increment the stack pointer
        print "inc_stack_pointer" >> filename
}
else {
        print "pop_word(" EADDR ")" >> filename
        print "swap_word(" EADDR ")" >> filename
        print "move_word(" EADDR "," reg[i] ")" >> filename increment the stack pointer
        print "inc_stack_pointer" >> filename
```

Fig. 8F

```
        }
        print out the finish macro
        print "end1" >> filename
        print "end0" >> filename
    }
    for (j = 0; j < 8; j++) {
        #cyle round for the 3 bit register field
        for (i=0; i< 8; i++) { calculate the first byte value for
            #0b01010xxx -> 0x58 + (3 bit from i)
            val = 88 + i
            jval = 88 + j set the output filename
            filename = "/tmp/" hex [val] "." pid print "#include \"mac_reg\"" >> filename
            print "#include \"mac_addr\"" >> filename
            print "#include \"mac_util\"" >> filename
             print "#include \"mac_pop\"" >> filename
            print "#include \"mac_seg\"" >> filename
            print "#include \"mac_int\"" >> filename print out a header comment
            print " " >> filename
            print "|" >> filename
            print "| Pop Word reg(" comreg[i] ")" >> filename
             print "|" >> filename print out the label
             print ".globl _0 hex[val] "A" hex[jval] >> filename
             print "_0" hex[val] "A" hex[jval] ": " >> filename
```

Fig. 8G

```
# the stack pointer is a special case
    if(i== sp) {
        print "pop_word(" SCRATCH_1 ")" >> filename
        print "swap_word(" SCRATCH_1 ")" >> filename
        if(i != j) {
            print "put_sp("SCRATCH_1 ")" >> filename
        }
    }
    else if(i != j) {
        # Special case for Motorola data registers
        if ( typewreg[i] == "data" ) {
            print "pop_word(" reg[i] ")" >> filename
            print "swap_word(" reg[i] ")" >> filename increment the stack pointer
            print "inc_stack_pointer_no_store" >> filename
        }
        else {
            print "pop_word(" EADDR ")" >> filename
            print "swap_word(" EADDR ")" >> filename
            print "move_word(" EADDR "," reg[i] ")" >> filename increment the stack pointer
            print "inc_stack_pointer_no_store" >> filename
        }
    }
    else {
        print "just_sp" >> filename increment the stack pointer
        print "inc_stack_pointer_no_store" >> filename
    }
} # At this point the stack pointer is in mc68020 reg " SCRATCH_1 "
```

Fig. 8H

```
# the stack pointer is a special case
if (j == sp) {
    print "pop_word_no_get(" EADDR ")" >> filename
    print "swap_word(" EADDR ")" >> filename
    print "put_sp(" EADDR ")" >> filename
}
# Special case for Motorola data registers
else if ( typewreg[j] == "data" ) {
    print "pop_word_no_get(" reg[j] ")" >> filename
    print "swap_word(" reg[j] ")" >> filename increment the stack pointer
    print "inc_stack_pointer" >> filename
}
else{
    print "pop_word_no_get(" EADDR ")" >> filename
    print "swap_word(" EADDR ")" >> filename
    print "move_word(" EADDR "," reg[j] ")" >> filename increment the stack pointer
    print "inc_stack_pointer" >> filename
} print out the finish macro
print "end2" >> filename
print "end0" >> filename
```

Fig. 8 I

```
for (j = 0; j < 4; j++){ cyle round for the 3 bit register field
    for (i=0; i<8; i++) { calculate the first byte value for
        # 0b01010xxx -> 0x58 + (3 bit from i))
        val = 88 + i
        jval = 7 + j * 8 set the output filename
    filename = "/tmp/" hex[val] "." pid print "#include \"mac_reg\"" >> filename
    print "#include \"mac_addr\"" >> filename
    print "#include \"mac_util\"" >> filename
    print "#include \"mac_pop\"" >> filename
    print "#include \"mac_seg\"" >> filename
    print "#include \"mac_int\"" >> filename print out a header comment
    print " " >> filename
    print "." >> filename
    print "| Pop Word reg(" comreg[i] ")" >> filename
    print "|" >> filename print out the label
    print ".globl _0" hex[val] "A" hex[jval] >> filename
    print "_0" hex[val] "A" hex[jval] ": " >> filename
```

Fig. 8 J

```
# the stack pointer is a special case
if(i == sp) {
    print "pop_word(" SCRATCH_1 ")" >> filename
    print "swap_word(" SCRATCH_1 ")" >> filename
    print "put_sp(" SCRATCH_1 ")" >> filename
}
# Special case for Motorola data registers
else if (typewreg[i] == "data" ) {
    print "pop_word(" reg[i] ")" >> filename
    print "swap_word(" reg[i] ")" >> filename increment the stack pointer
    print "inc_stack_pointer_no_store" >> filename
}
else {
    print "pop_word(" EADDR ")" >> filename
    print "swap_word(" EADDR ")" >> filename
    print "move_word(" EADDR "," reg[i] ")" >> filename increment the stack pointer
    print "inc_stack_pointer_no_store" >> filename
}
# pop a word
print "pop_word_no_get(" EADDR ")" >> filename
print "swap_word(" EADDR ")" >> filename put the segment register
print "put_" sreg[j] "(" EADDR ")" >> filename
# if we modify the code segment set a fictitious
interrupt to reset the program counter.
if(j == cs) {
    print "set_pc_interrupt" >> filename
}
```

Fig. 8K

```
        # increment the stack pointer
        print "inc_stack_pointer" >> filename print "end2" >> filename print "reset_seg_defaults" >> filename
            print "route_it" >> filename
        }
    }
    exit
}
( inst_type == "SEG_REG") {
    # cyle round for the 2 bit register field
    for (i=0; i<4; i++) { calculate the first byte value for
        # 0b000xx111 -> 0x07 + 8 * (2 bit from i)
        val = 7 + i * 8 set the output filename
        filename = "/tmp/" hex[val] "." pid print "#include \|mac_reg\|"" >> filename
        print "#include \|mac_addr\|"" >> filename
        print "#include \|mac_util\|"" >> filename
        print "#include \|mac_pop\|"" >> filename
        print "#include \|mac_seg\|"" >> filename
        print "#include \|mac_int\|"" >> filename
```

Fig. 8L

```
# print out a header comment
print " " >> filename
print " |" >> filename
print " | Pop segment reg(" somreg[i] ")" >> filename
print " |" >> filename print out the label
print ".globl _0" hex[val] "A00" >> filename
print "_0" hex[val] "A00: " >> filename pop a word
print "pop_word(" EADDR ")" >> filename
print "swap_word(" EADDR ")" >> filename get the segment register
print "put_" sreg[i] "(" EADDR ")" >> filename if we modify the code segment set a fictitious
interrupt to reset the program counter.
if(i == cs) {
    print "set_pc_interrupt" >> filename
}
```

Fig. 8M

```
# increment the stack pointer
print "inc_stack_pointer" >> filename print out the finish macro
print "endl" >> filename print "reset_seg_defaults" >> filename
print "route_it" >> filename for (j = 0; j < 4; j++) { cyle round for the 2 bit register field
for (i=0; i<4; i++) { calculate the first byte value for
0b000xxx111 -> 0x07 + 8 * (2 bit from i)
val = 7 + i * 8
jval = 7 + j * 8 set the output filename
filename = "/tmp/" hex[val] "." pid print "#include \"mac_reg\"" >> filename
print "#include \"mac_addr\"" >> filename
print "#include \"mac_util\"" >> filename
print "#include \"mac_pop\"" >> filename
print "#include \"mac_seg\"" >> filename
print "#include \"mac_int\"" >> filename
```

Fig. 8N

```
# print out a header comment
print "" >> filename
print "|" >> filename
print "| Pop segment reg(" somreg[i] ")" >> filename
print "|" >> filename print out the label
print ".globl _0" hex[val] "A" hex[jval] >> filename
print "_0" hex[val] "A" hex[jval] ":" >> filename if(i != j) { pop a word
    print "pop_word(" EADDR ")" >> filename
    print "swap_word(" EADDR ")" >> filename get the segment register
    print "put_" sreg[i] "(" EADDR ")" >> filename if we modify the code segment set a fictitious
    # interrupt to reset the program counter.
    if(i == cs) {
        print "set_pc_interrupt" >> filename
    }
```

Fig. 80

```
        }
        else {
            print "just_sp" >> filename
        }
        # increment the stack pointer
        print "inc_stack_pointer_no_store" >> filename pop a word
        print "pop_word_no_get(" EADDR ")" >> filename
        print "swap_word(" EADDR ")" >> filename get the segment register
        print "put_ " sreg[j] "(" EADDR ")" >> filename if we modify the code segment set a fictitious
        # interrupt to reset the program counter.
        if(j == cs) {
            print "set_pc_interrupt" >> filename
        } increment the stack pointer
        print "inc_stack_pointer" >> filename print out the finish macro
        print "end2" >> filename print "reset_seg_defaults" >> filename
        print "route_it" >> filename
    }
}
```

Fig. 8P

```
for (j = 0; j < 8; j++) { cyle round for the 2 bit register field
    for (i=0; i<4; i++) { calculate the first byte value for
        # 0b000xxx111 -> 0x07 + 8 * (2 bit from i)
        val = 7 + i * 8
        jval = 88 + j set the output filename
        filename = "/tmp/" hex[val] "." pid print "#include \"mac_reg\"" >> filename
        print "#include \"mac_addr\"" >> filename
        print "#include \"mac_util\"" >> filename
        print "#include \"mac_pop\"" >> filename
        print "#include \"mac_int\"" >> filename
        print "#include \"mac_seg\"" >> filename
```

Fig. 8Q

```
# print out a header comment
print " " >> filename
print "|" >> filename
print "| pop segment reg(" somreg[i] ")" >> filename
print "|" >> filename print out the label
print ".globl _0" hex[val] "A" hex[jval] >> filename
print "_0" hex[val] "A" hex[jval]":" >> filename pop a word
print "pop_word(" EADDR ")" >> filename
print "swap_word(" EADDR ")" >> filename get the segment register
print "put_" sreg[i] "(" EADDR ")" >> filename if we modify the code segment set a fictitious
interrupt to reset the program counter.
if(i == cs) {
    print "set_pc_interrupt" >> filename
} increment the stack pointer
print "inc_stack_pointer_no_store" >> filename
```

Fig. 8R

```
# the stack pointer is a special case
if(j == sp) {
    print "pop_word_no_get(" EADDR ")" >> filename
    print "swop_word(" EADDR ")" >> filename
    print "put_sp(" EADDR ")" >> filename
}
# Special case for Motorola data registers
else if ( typewreg[j] == "data" ) {
    print "pop_word_no_get(" reg[j]")" >> filename
    print "swap_word(" reg[j] ")" >> filename increment the stack pointer
    print "inc_stack_pointer" >> filename
}
else {
    print "pop_word_no_get(" EADDR ")" >> filename
    print "swap_word(" EADDR ")" >> filename
    print "move_word(" EADDR "," reg[j] ")" >> filename increment the stack pointer
    print "inc_stack_pointer" >> filename
}
print out the finish macro
print "end2" >> filename
print "end0" >> filename
```

Fig. 8S

```
*GENERATED by gen_add_w*
#include "mac_reg"
#include "mac_util2"
#include "mac_addr"
#include "mac_util"
#include "mac_add"
.globl _0Ø1AØØ
_0Ø1AØØ: mØrmØ
get_op_wr(dØ,d7)
segmentds
get_op_wm(d1,aØ@)
doit(d1,dØ,movw,addw)
put_wm
end2
video_word
endØ
```

Fig. 9

```
#define AX_REG d7
#define BX_REG d6
#define CS_REG _CX
define DX_REG _DX define SP_REG a1
define BP_REG _BP
#define SI_REG _SI
define DI_REG _DI define AH_REG d7
define BH_REG d6
#define CH_REG _C
define DH_REG _D define AL_REG d7
define BL_REG d6
#define CL_REG _C+1
define DL_REG _D+1 define SS_REG a2
define DS_REG a6
#define DS_OVR _M_DS
#define CS_REG _M_CS
#define ES_REG _M_ES
```

Fig. 10A

```
#define DEST_ADDR a0
#define JUMPT a4
#define PC a5
define SS_OVR a3 define OP1 d0
define OP2 d1
#define RESULT d2
#define CODES d3
#define EADDR d4
define SCRATCH_1 d5 define m0rm0 movw BX_REG,EADDR; addw SI_REG,EADDR | BX+SI
/* video check code */
#define video_word\
    cmpl gvi_low_regen,DEST_ADDR;\
    bgel video_word_routine
#define segmentds movl DS_REG,DEST_ADDR; addl EADDR,DEST_ADDR | add s
#define end0 check_mac; movw PC@,EADDR; jra JUMPT@(EADDR:1:4)@
#define end2 addql #2,PC | inc opcode and return
#define pop_word(src)\
get_sp(SCRATCH_1); movw SS_REG@(SCRATCH_1:1), src | pop a word on the
#define inc_stack_pointer\
addqw #2,SCRATCH_1; put_sp(SCRATCH_1) | increment the stack pointer
```

Fig.10B

APPARATUS AND METHOD FOR EMULATING A COMPUTER INSTRUCTION SET USING A JUMP TABLE IN THE HOST COMPUTER

BACKGROUND OF THE INVENTION

This invention relates to data processing.

There exists a variety of commercially available processors which are capable of providing the central processing unit of a computer. Each processor can perform arithmetic, logical and control instructions and is adapted to cooperate with a particular organisation of memory and input and output devices. To a large extent, the instructions and the manner of addressing data held in the processor or stored in memory, are characteristics of a particular processor or family of processors. As a result, computer programs written for one computer—or range of computers based on a like processor—are frequently unsuitable for use with computers based on a different processor.

It is the case that a large body of commercially available software is based on a common operating system which can run only on particular processors. Computers which are based upon an incompatible processor are not capable of using such software even though the processor may in certain technical respects be superior to the processor for which the software is written. This problem of incompatibility has been recognised and attempts have been made to deal with the problem in two different ways. First, it has been suggested to provide in a computer based on a selected first processor, a second processor serving as a co-processor to provide the necessary compatability. This obviously involves cost penalties. Second, it has been proposed to provide software by which the existing first processor is caused to emulate a different second processor. To be of practical utility, the emulation must not involve a significant drop in effective processing speed and this presents enormous difficulties, even where the processor being used is inherently faster than that being emulated so that the additional processing required by the emulation is to some extent offset by faster processing. It will be recognized that speed is important not only because a user may demand a fast response time, but also because a particular effective processing speed or minimum processing speed is essential for the correct functioning of certain programs.

This invention focuses on the software emulation approach and for clarity hereafter the term "host" will be used to mean the processor which is through software caused to emulate a different processor (the emulated processor).

In what follows, particular attention will be paid to microprocessors though it should be understood that either or both of the host and emulated processors might take other forms.

To take a specific example, consider emulation of the microprocessor manufactured by Intel Corporation and referred to as 8088. This has an instruction set whose instructions are defined by some number of 8-bit bytes the first of which is an operating code (op-code). The instruction set comprises approximately 230 op-codes (not all possible instruction labels being used). Most instructions require one or more operands and the second byte of those instructions may be regarded as defining the mode of addressing the operand. This may recite specific memories or registers and may occasionally include data. In other microprocessors, it may be a byte other than the second byte of the instruction which performs a function comparable to that of the 8088 addressing mode.

If it is desired to emulate the operation of the 8088 microprocessor, several characteristics of that processor must be emulated. Chiefly, the instruction set of the 8088 must be mapped on to that of the host microprocessor. Inevitably, there will not be a one to one mapping. In addition it will be necessary to recreate, using the facilities of the host microprocessor, the many permutations of addressing modes provided by the 8088. To interpret instructions using prior art techniques would require for each operating code (that is to say the first byte of each instruction) a routine which was capable of analysing the second and subsequent bytes of the instruction and providing an appropriate series of instructions in the instruction set of the host microprocessor. Having regard to the facts that there would inevitably be no direct mapping of operations between the emulated microprocessor and the host microprocessor and that there are likely to be differences in registers and memory addressing, the subroutine corresponding to each 8088 operating code would be complex and would typically involve a number of conditional statements serving to distinguish between different addressing modes. Running such a complex subroutine for every instruction, inevitably slows down processing. Further complications will arise in dealing with the flags (such as auxiliary carry and parity) which are provided by the 8088 but not by the host, and in handling interrupts.

SUMMARY OF THE INVENTION

It is one object of this invention to provide for the emulation of a microprocessor without a significant loss of effective speed. It is recognised that emulation will inevitably involve additional processing but its significance must be judged in terms of the processing speed of the host microprocessor. It is anticipated that the host microprocessor will have a faster processing speed than the microprocessor it is desired to emulate (perhaps by an order of magnitude) and the additional processing associated with the emulation will not result in a significant loss of effective speed provided that the amount of additional processing is of the same order or less than the increase in processing speed of the host.

Accordingly, the present invention consists, in one aspect, in data processing unit adapted to be controlled by sequential instructions, a substantial number of which comprise an operation code selected from a set of n such codes and a qualifying code selected from a set of m such codes, the data processing unit comprising a store having approximately n times m locations with each location corresponding to a consistent combination of operating code and qualifying code and holding a series of instructions corresponding to the said operating code and qualifying code.

By "qualifying code" is meant the next most significant byte or other discrete element in the instruction, after the instruction code.

In another aspect, the present invention consists in a process for controlling the operation of a data processing unit in accordance with a received series of instructions, where at least some instructions each comprise an operator and an operand addressor, there being a finite number of permissible combinations of operator and operand addressor, the process comprising the steps of holding a plurality of instruction strings, one for each said permissible combination of operator and operand addressor, and inputting to the data processing unit for each received instruction, the instruction string corresponding with said operator and operand addressor combination.

In a still further aspect, the present invention consists in a computer including a processing unit; first store for storing a series of instructions, a substantial number of which instructions comprise an operator and an addressing mode; second store having a plurality of locations corresponding respectively with permissible combinations of said operator and said addressing mode, and being adapted to hold at each said location an instruction string; and a control unit adapted to input in sequence to said processing unit instruction strings from locations in said second store corresponding respectively with instructions from said first store.

Preferably, the computer further comprises table having entries corresponding with respective said locations, each entry comprising the address in said second store of the said instruction string.

Advantageously, each instruction string is arranged to provide said control unit with information relating to the address in said first store of the next instruction.

BRIEF DESCRIPTION OF THE DRAWING

This invention will be described by way of example, with reference to the accompanying drawings in which:

FIGS. 2A, 2B and 2C are listings of certain code strings in the language of the host microprocessor;

FIG. 3 is a listing illustrating means for generating the code strings exemplified by the extracts of FIGS. 2A, 2B and 2C;

FIGS. 8A-8S are an extract from the listing of the general generator Program as shown in FIG. 4;

FIG. 9 is an extract from the listing of the pseudo commands shown in FIG. 5,

FIGS. 10A, 10B are an excerpt from the listing of the macro library shown in FIG. 6 and FIGS. 11A and 11B illustrate in diagrammatic form an interrupt technique according to the prior art and to the present invention respectively.

DESCRIPTION OF PREFERRED EMBODIMENTS

Figure 1:
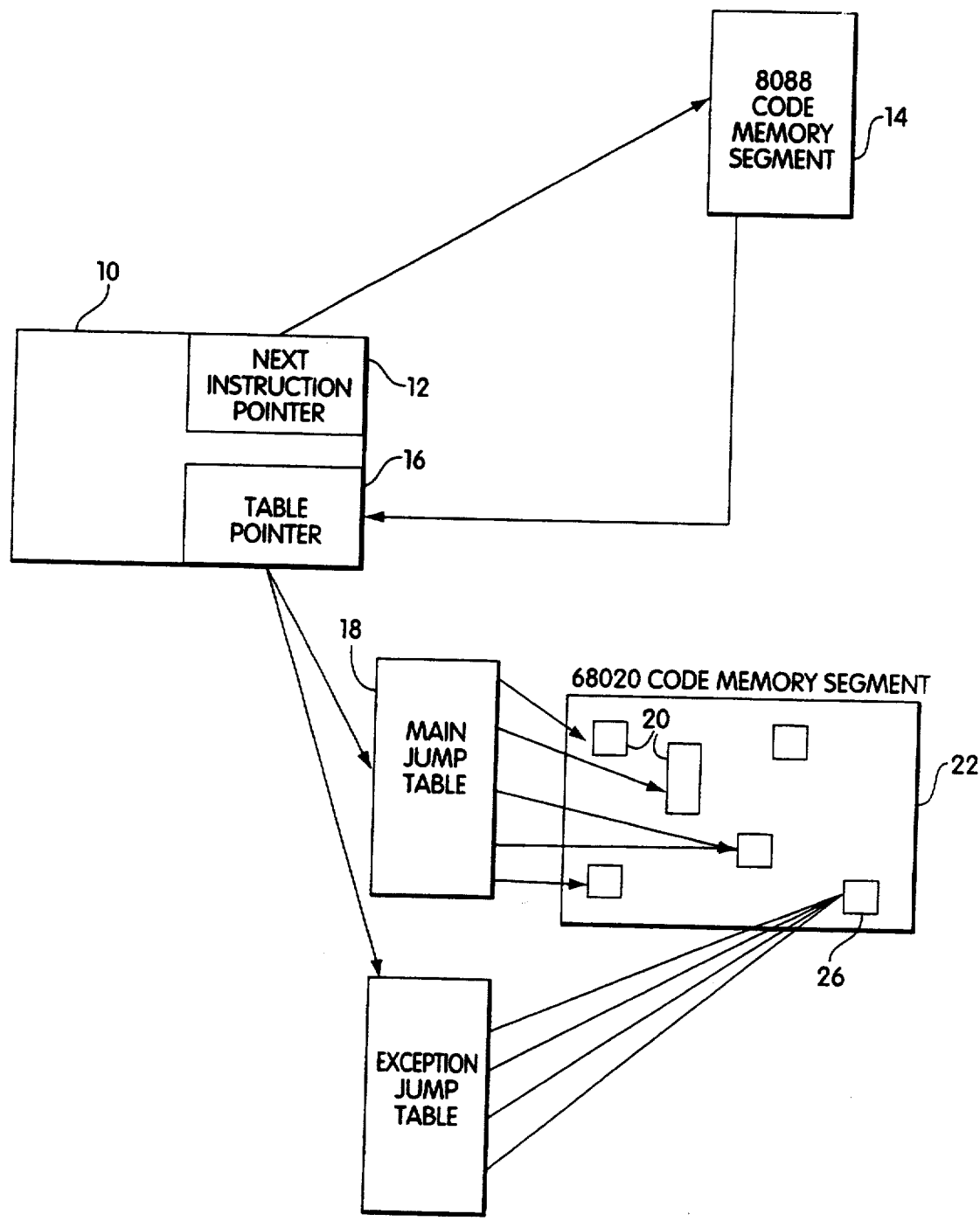
FIG. 1 is a diagrammatic representation of aspects of the invention.

This description will continue to take as an example of a microprocessor whose operation is to be emulated, the 8088 chip manufactured by Intel Corporation, and will take as an example of a host microprocessor the MC68020 chip manufactured by Motorola Corporation. Before proceeding to a detailed description of the invention, it would be helpful to outline certain relevant aspects of the 8088 chip.

Two extremely important characteristics of the 8088, as with any other microprocessor, are the instruction set and the manner in which the addressing of data is handled. The instruction set includes arithmetic, logical and control instructions and takes the machine code form of a single byte op-code. There are, for example, six op-codes corresponding to the arithmetic assembly instruction ADD; the op-codes distinguishing between byte and word operation and between, for example, memory and register operands. The operand itself is defined in the second and—if necessary—succeeding bytes of the instruction string, it being recognised that certain op-codes demand no operand.

Data which is to be operated upon can be addressed in a variety of addressing modes. The data itself could for example form part of the instruction or be located in a processor register named in the instruction. Alternatively, the instruction could contain the address in memory at which the data is located or might state the register containing the address or the registers which require to be summed to obtain the memory address. The skilled man will be aware of still further addressing modes.

As outlined above, attempts have hitherto been made to emulate the 8088 using each op-code in the instruction string as the address in a single byte look up table which, for each op-code, point to necessary coding (in the machine language of the host microprocessor) to enable analysing of the addressing mode and other information contained in succeeding bytes of the instruction stream and to execute the decoded instruction. The difficulty with this approach is that the very flexibility in addressing modes which contributes to the power of the 8088 microprocessor results in coding strings of significant length and complexity for many of the op-code possibilities. As will be recognised, this means that the emulation runs at a slower effective speed than the microprocessor that is being emulated, unless the host microprocessor has a considerably faster processing speed.

According to this invention, a look up or jump table is provided which is addressed by each op-code and the immediately succeeding byte in the instruction stream. With nominally 256 possibilities for both the op-code and the next suceeding byte, the table accordingly has (nominally) 64 K entries. From the very nature of the jump table—in which every consistent combination of op-code and addressing mode is represented a Jump to any one location "implies" the addressing mode which is employed, without the need for decoding as such. Each entry in the Jump table contains the address in memory of an instruction string in MC68020 code which will perform the equivalent function to the 8088 instruction. The 68020 coding which is required is straightforward (as compared with prior software emulations) since no decoding of the addressing mode is required. The need for conditional statements in the emulation coding is substantially avoided.

By way of further explanation, reference is directed to FIG. 1 which is in diagrammatic form. The microprocessor 10 provides a "next instruction pointer" 12 whose function is to point to the next 8088 instruction held in code memory segment 14. In the 8088. the base or datum point of the instruction list is held in a code segment register. The address relative to the base address of the next instruction in the instruction stream (which may be regarded as the logical address) is held in a separate register referred to as the instruction pointer. This is in the most usual case incremented by an amount corresponding to the length of the last instruction although jumps can also be provided for. The physical memory address, which is 20 bits in the 8088. is constructed by adding the 16 bit content of the instruction pointer (logical address) to the 16 bit content of the code segment register (base address) with four low order zero's appended. In the present arrangement, the 68020 register a5 is used to hold the sum of the base address, the logical address and the base of the pseudo 8088 code memory segment. This makes the content of a5 a "physical" 32 bit 68020 memory address. This avoids the need for repeated add functions. If necessary (because of a jump or segment relocation, for example) the logical address can be reconstituted from a5 by subtraction.

In accordance with this invention, the fetched instruction is not executed directly by the processor, but the first two bytes are used in table pointer 16 to point to the appropriate entry in the 64 K jump table 18. For a reason which will be described hereafter, the table pointer 16 includes a base table pointer (in 68020 register a4) acting as a base to the Jump table addresses. Each jump table entry provides the 32 bit start address of an instruction string 20 in 68020 code memory segment 22. These instructions are then executed.

Reference is now directed to FIG. 2A which is a listing of a number of 68020 instruction strings relating to the POP op-code which is taken as an example of an 8088 op-code. As will be understood, the POP command transfers the word at the current top of the stack to the destination operand. According to the addressing mode, the destination operand may be a register or may be a memory location pointed to by a particular register or combination of registers, with or without a displacement defined in the third or subsequent instruction bytes. The instruction strings are referred to by the label OXXAYY where XX is in hexadecimal the op-code and YY the addressing mode. In a typical situation, the addressing mode takes the form MOD 000 R/M where MOD represents the first two bits and states whether the three bit R/M element is to be regarded as defining the destination operand as a register or as a pointer in register to the destination operand in memory, with or without a displacement. Taking examples in turn from FIG. 2A, label 08FA00 represents, in decoded form, op-code 10001111 (binary) and addressing mode code 00 000 000 where the addressing mode code has been broken up to identify the MOD and R/M components. In the first example, the destination operand is pointed to by the sum of registers BX (general register) and SI (source index), this being the meaning assigned to the R/M value 000 with an MOD value of 00. The 68020 coding at this location performs the POP function using essentially ADD and MOVE instructions. A detailed analysis of the coding is not believed to be necessary for an understanding of the invention but it can be identified that the destination address is first decoded from registers BX and SI, a word moved from the stack to that address and the stack pointer incremented by two so as to point to the next word in the stack.

Comparing the coding at the next location which corresponds to addressing mode 01 000 000, it would be seen that the coding is very similar but includes in the address computation a displacement. This is a single byte displacement as signified by an MOD value of 01. The next following location has a two byte displacement as signified by the MOD value 10.

With an op-code requiring both source and destination operand, the addressing mode may take the form MOD REG R/M where REG identifies the word, byte and segment registers. For such an op-code, there are of course a greater number of permissible addressing modes and accordingly a greater number of entries in the jump table and corresponding 68020 code strings. Still other op-codes may take an addressing mode of further modified form.

If two contiguous op-codes are both of a kind requiring no operand, the address in the jump table can be of a string of 68020 code performing both instructions. This gives a net increase in speed.

By the way of further explanation, reference is drawn to FIG. 2A and particularly to the entries under labels 05bA00 and 05bA58. The 8088 op-codes 58 to 5f (hexadecimal) are instructions which require no separate operands; the operand being implied within the op-code. Thus op-code 5b pops a word to register BX. Turning to FIG. 2A it will be seen that the code string under label 05ba00 performs that function. If the second byte of the 8088 instruction is a further command of the same type (e.g. 58) the processor will by executing the code string shown under label 05bA58 execute both POP instructions, that is to say POP to BX followed by POP to AX. This optimisation procedure covers, in the present example, those register and segment variants of the POP and PUSH commands.

If the second byte of the instruction stream is not a POP or PUSH command, the jump table points in each case to the code string shown (in this example) under label 05bA00, the op-code pointer in a5 is incremented by one only and the second byte is treated as the first byte of the next instruction.

It will be recognised that in an emulation, means has to be provided for updating the information pointer analogue. According to a preferred feature of the present invention the coding which performs this task is contained at the end of substantially each 68020 code string. That is to say each code string provides for incrementing of the register a5 (analogous to the 8088 information pointer) by an amount equal to the length of the corresponding 8088 instruction.

Referring again to the code strings shown in FIG. 2, it will be noted that an add instruction of the form addql#x,a5 is included at every location. This is consistent throughout the entire array of 68020 code strings.

This increments the op-code pointer in register a5 by the number x of bytes occupied by the Current instruction. Thus it will be seen that the coding for location 08FA00 includes the instruction of addql #2.a5, the 8088 instruction being a 2 byte instruction. As explained above that the following code string refers to the same op-code with an addressing mode that includes a displacement which (in MOD 01) is an 8-bit displacement extended to 16 bits. The operand accordingly requires 2 bytes, the entire instruction occupies 3 bytes and the coding is provided for incrementing by 3 the op-code pointer in register a5. In the next string, a 16-bit displacement is employed, the instruction requires 4 bytes and coding is provided to add 4 to the op-code pointer.

In addition to incrementing the op-code pointer, the code string serves through move and jump commands (in particular:—move a5@,d4; jra a4@(d4:1:4) to take the processor directly to the 68020 code string whose address is contained in the jump table entry pointed to by the next 8088 instruction. It will be noted that the jump is made with respect to a base table pointer held in register a4, as noted above.

The penalty in memory space paid for adding this extra coding to every string is negligible, but the ability to move directly to the 68020 instruction string corresponding to the next 8088 instruction does provide a significant advantage in processing time.

It will be well known to the skilled man that under certain situations it is necessary to depart from the strict sequence of "fetch, execute, fetch, . . . " instructions described above. This will usually involve the use of so-called interrupts. These may be used to enable the microprocessor to interact with input or output devices operating at different speeds. The interrupt mechanism can also be used to divert control from the microprocessor to a special routine held in memory.

It has been mentioned above that a particular difficulty in emulation arises with providing an interrupt handling capability. In the normal case, asynchronous interrupt requests that are supplied to the 8088 will only take effect at the end of the current instruction. With the emulation, however, it cannot be guaranteed that an interrupt will not occur part way through a 68020 code string, possibly causing a crash. In accordance with a preferred feature of this invention, an asynchronous interrupt is caused to alter the jump table base point in a4. This has no immediate effect but at the end of the current 68020 instruction string, the instruction jra a4@(d4:1:4) causes a jump to be made not to the main jump table as previously described but to an exception jump table. This is illustrated in FIG. 1 at 24. This exception jump table 24 again has 64 K entries but each points to a common piece of coding 26 in the 68020 code memory segment which processes the interrupt. A similar techniqe is used to deal with segment override.

It has been mentioned that the 8088 maintains a series of flags, these comprising three control flags and six status flags. Many of the arithmetical op-codes affect the status flags in particular and it is an essential requirement of a workable emulation of the 8088 processor that the information embodied in the flags be available for immediate access. In one approach, the coding at each location of the jump table corresponding with an op-code known to effect flags would update analogous flags held in one or more registers of the host microprocessor. In accordance with a preferred feature of this invention, however, an alternative approach is adopted and no attempt is made to keep all flags continuously updated. Rather, the necessary information is held to enable generation of the flags immediately a request is received for access to the flags. Taking into account the expected frequency of operations which, on the one hand effect flags and on the other are dependent upon flag information, the approach preferred in this invention represents a significant saving in processing time.

By way of further explanation, the 8088 processor uses bit 2 of the status word as a parity flag. This is arranged to hold at all times the parity of the last byte result and is used, for example, in instructions such as "Jump on the parity". It happens that the 68020 processor does not automatically maintain a parity flag. According to the preferred feature of the present invention, any 68020 code string which performs the function of an 8088 instruction affecting parity, is arranged to leave the last result byte in register d2. Reference is drawn, for example, to FIG. 2B which is the 68020 code string for the label 001A00, being one of the ADD instructions. It will be seen from line 5 that the result of the "add word" instruction is put in register d2. In line 6 this result is moved to register d4, rotated (taking into account the differing conventions on high end low bytes between the 8088 end the 68020) end moved to the address previously set up in register a0. The result however remains in register d2.

Turning to FIG. 2C, there is shown the 68020 code string for the label 07aA00 which is a "jump on even parity" instruction. It will be seen from line 1 that the result byte from d2 is moved to register d4, which has previously been zeroed. A look up is then performed in a parity table "PF table", which hold for each 256 values of the byte result, the appropriate parity value 0 or 1. This parity value is placed in register d4 end, in line 2, a byte test operation is performed to provide the subject for the jump in line 3.

A similar problem arises with the auxiliary carry flag which is not provided in the 68020 processor. This is handled in a manner analogous to that described above for the parity flag.

Even taking into consideration the fact that there are slightly less then 256 op-codes end the fact that not every addressing mode is appropriate for each op-code, the creation of the 68020 code strings as described above is a major undertaking. With knowledge of the amount of coding typically required at a single location, it is thought that approximately 300,000 lines of coding are involved. To write, end perhaps more importantly to debug this amount of code probably would be regarded as impractical for a commercial product. According to a further aspect of this invention, however, a method is provided for the automatic generation of the necessary coding. This will now be described in detail.

Figure 4:
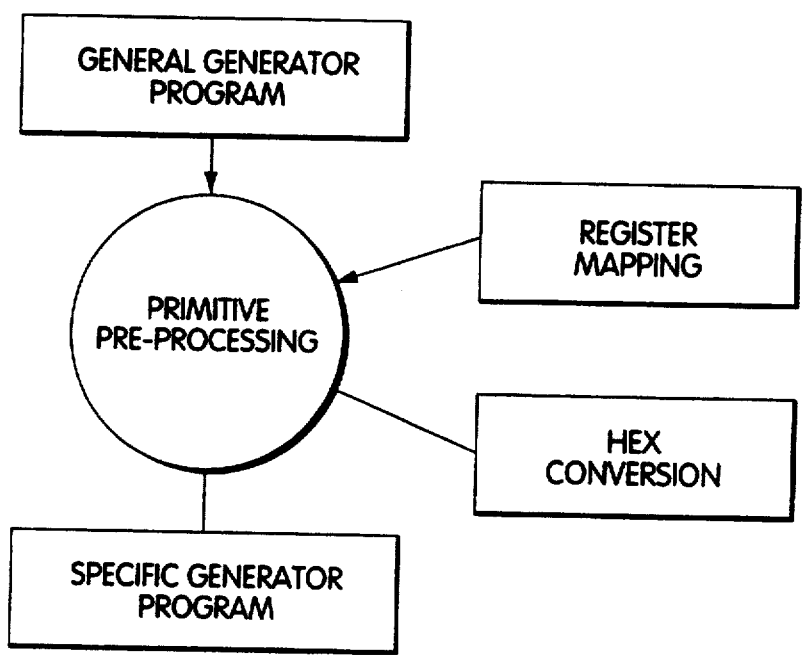
FIGS. 4, 5, 6 and 7 are flow charts illustrating the operation of said generator means.

A separate code generator is provided for each 8088 op-code or each category of op-codes. Continuing with the example of the POP instructions, a "make POP" generator is provided and a specific example of this is shown in the listing which is FIG. 3. Referring to the diagram which is FIG. 4, it will be seen that a primitive preprocessing stage takes a generalised generator program such as that exemplified in the listing of FIG. 8 to produce a specific generator program for the host microprocessor. In this preprocessing stage, information is taken from a register mapping table which maps the 8088 registers on to the registers available on the host. It is, if necessary, possible to map an 8088 register onto a memory address. The primitive preprocessing stage also makes reference to a hex look-up table, which provides hexadecimal equivalents.

Figure 5:
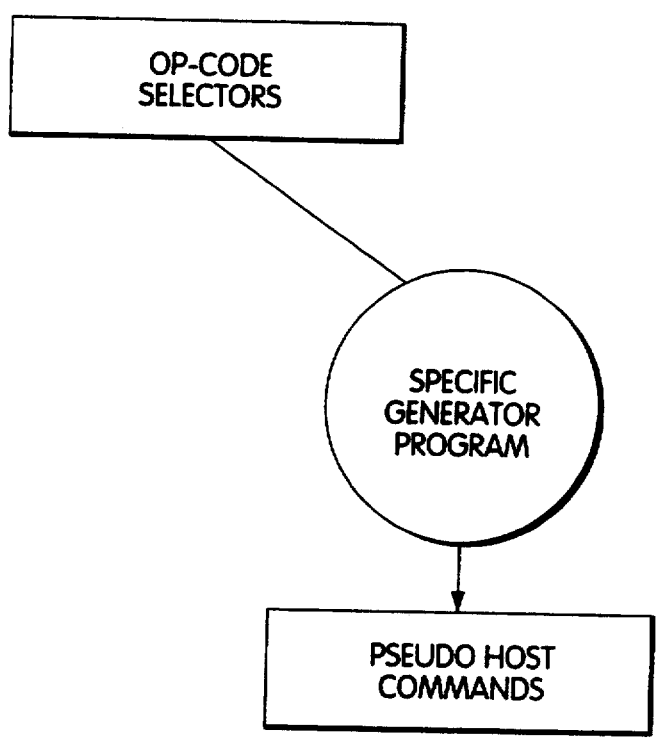
Figure 6:
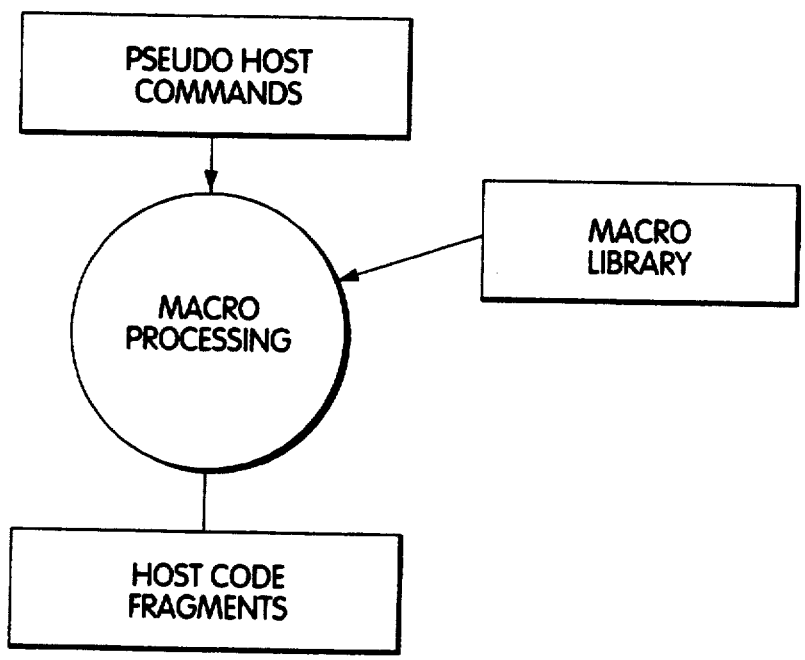
Figure 7:
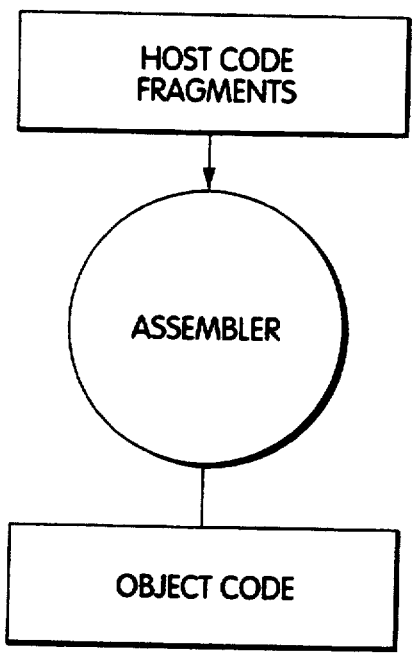

The specific generator program, as illustrated in FIG. 5, is then driven by op-code selectors to produce so-called pseudo-host code fragments, an example of which appears in FIG. 9. These refer extensively to macros. As illustrated in FIG. 6, a macro processing stage then converts the pseudo-code fragments into the required code string by referring to a macro library. There is contained in FIG. 10 an excerpt from the macro library containing those macros referred to in the pseudo-host code fragments of FIG. 9. The output of this macro processing stage is the code string 08fa00 as shown in FIG. 2 which is, in a final assembly process illustrated in FIG. 7, converted into object code.

It will be well known to the skilled man that certain microcomputers based on the 8088 chip transfer processing control, under certain circumstances, to selected portions of 8088 code held in ROM. These code portions may represent service routines for communicating with input and output devices, for example. The service routines can also be called by application programs, providing a standard interface.

According to a preferred form of this invention, provision is made for service routines which are in 68020 code and can thus be executed by the host processor in "native" mode, that is to say without reference to the jump table. The service routines can be written in a high level language such as "C" and then compiled. This is a considerable advantage for programmers.

Figure 11A:
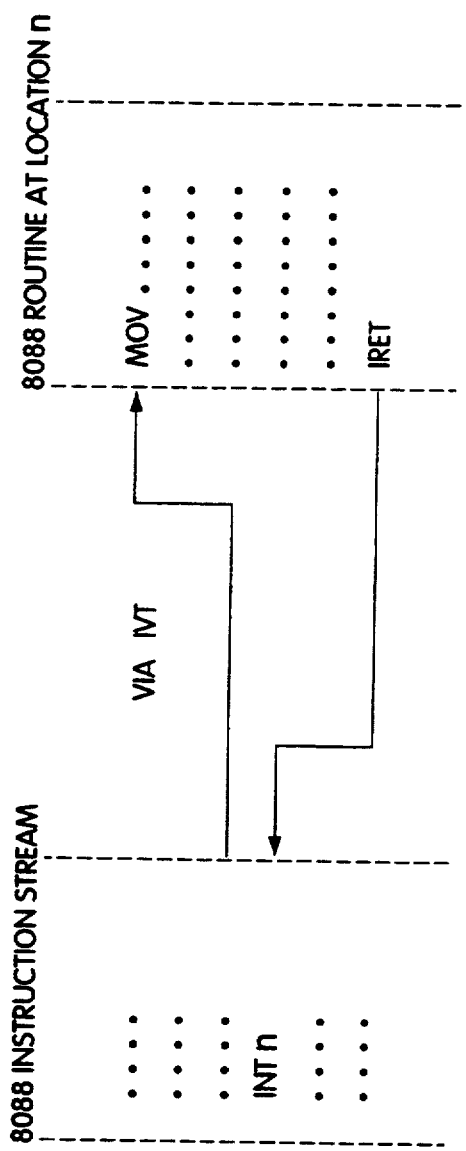
Figure 11B:
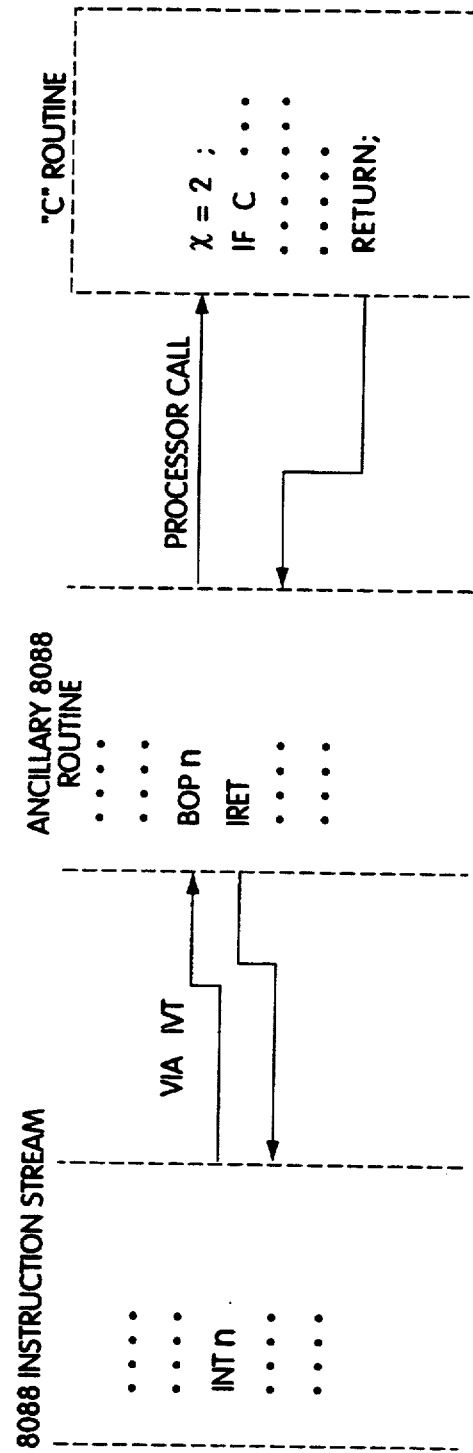

The 8088 command transfers control to a memory location which—instead of marking the beginning of a sequence of 8088 commands, terminating with IRET—contains a pseudo-8088 command. By "pseudo-command" is meant an op-code which is not given a definition in the 8088 instruction set. Depending upon the operand of the pseudo-command, a program call is made to an indexed high level language routine. By this ingenious means it is possible to call a high level language routine in a manner which is transparent to software running on the emulation. This use of a pseudo-command can be better understood by reference to FIGS. 11A and 11B which illustrate in diagrammatic form the use of a software interrupt respectively in conventional form and in accordance with a preferred feature of this invention. Referring to FIG. 11A, the instruction INT n in the program which is running causes control to be passed from the CPU to a service routine defined by the Interrupt Vector Table (IVT) and the INT operand n. The service routine comprises a series of 8088 instructions terminated by the IRET instruction. Turning now to FIG. 11B, the instruction INT n results in control being transferred to a location defined again through the IVT. At that location, there is the pseudo-command BOP n causing a program call to be made at location n in a high level language program store. The service routine may typically be written in C. The service routine returns control to the BOP instruction string and the emulation process continues as previously described. Typically the next instruction following the BOP command will be the 8088 instruction IRET.

In addition to providing for fast running of fixed service routines, this technique enables the host processor to communicate effectively with input and output devices. It should be understood that this invention has been described by way of example only and whilst those examples have been confined to emulation of the Intel 8088 on a Motorola microprocessor, the invention should not be regarded as restricted in any sense to this application.

In the described example, the Jump table is accessed using the first two bytes of the 8088 instruction which in a typical case comprise the operation and addressing mode respectively. This second byte may in most cases be regarded as the operand addressor since it points to or contains the operand. As has been explained the second byte may occasionally represent a second instruction and there may still be advantage in dealing with both bytes together. In some other cases, the value of the second byte is redundant to the jump process. In other emulations the operation code and such functions as the operand addressor may not form the first two bytes. In some cases it will be appropriate to use the operation code and the next most significant element in the instruction stream, for the purposes of accessing the host code strings.

Whilst a Jump table is the preferred manner of accessing the host instruction strings, other methods may be employed. Thus, with appropriate indexing, control might be passed directly to the start of the host instruction string.

The described method of generating the host instruction strings is felt to have considerable advantages but alternatives within the scope of this invention will exist.

The feature by which each location contains coding for addressing the next instruction; the manner in which interrupts are handled and the manner in which flags are dealt with are believed to represent further and separately novel advances.

I claim:

1. In data processing apparatus employing a processor which is to be controlled by a program comprising sequential instructions each of which is selected from a first instruction set which differs from a native instruction set of said processor, a substantial number of which instructions comprise an operation code selected from a set of n such codes and an operand addressor sufficient to directly obtain an operand, the operand addressor being selected from a set of m such operand addressors, the improvement comprising:

a store having approximately n times m locations with each location addressed by a consistent combination of an operation code and an operand addressor sufficient to directly obtain the operand, each location holding a series of instructions selected from a second instruction set different from the first instruction set, said second instruction set being the processor's native instruction set, and said series-performing the same function as an instruction corresponding to said operation code and operand addressor used to address the location without requiring additional indirection to obtain the operand; and control means for addressing said store, in response to each of the sequential program instructions, and for providing to said processor from said store, said series of instructions at the addressed location in the store and further for directly obtaining and providing to said processor each said operand without performing indirect addressing to obtain each said operand.

2. A process for controlling operation of a data processing unit having a store means and a processor in accordance with a received series of first instructions selected from a first instruction set which is not native to said processor, where at least some first instructions each comprise an operator and an operand addressor sufficient to directly obtain an operand without further indirection, there being a finite number of permissible combinations of operator and operand addressor, the process comprising the steps of holding a plurality of instruction strings in said store means, said store means having one location for each said permissible combination of operator and operand addressor and said instruction strings being comprised of second instructions in a second instruction set which is native to said processor, retrieving from said store means and inputting to the data processing unit in response to each received instruction, the held instruction string corresponding with said operator and operand addressor combination, and executing the held instruction string without performing indirect addressing to obtain the operand.

3. A computer comprising predetermined processing means; first store means for storing a series of first instructions taken from a first instruction set for another processing means, a substantial number of which first instructions comprise an operator and an operand addressor sufficient to directly obtain an operand without further indirection; second store means having a plurality of locations corresponding respectively with permissible combinations of said operator and said operand addressor, each of said locations holding an instruction string consisting of a set of second instructions different from said first instructions and taken from an instruction set for the predetermined processing means and different from the instruction set from which the first instructions are taken; and control means responsive to first instructions retrieved from said first store means for presenting for execution in sequence to said processing means instruction strings from locations in said second store means corresponding respectively with said retrieved instructions from said first store means and further for directly obtaining and providing to said predetermined processing means each said operand without performing indirect addressing to obtain each said operand.

4. A computer as claimed in claim 3, further comprising table means having entries corresponding with respective said locations, each entry comprising an address in said second store means of the instruction string.

5. A computer as claimed in claim 3, wherein each instruction string is arranged to provide said control means with information relating to an address in said first store means of a next first instruction in said series of first instructions.

6. A computer comprising:
processing means operating in response to instructions selected from a host instruction set;
first store means for storing a series of instructions each selected from an instruction set to be emulated using the host instruction set and the instruction set to be emulated differing from the host instruction set;
a substantial number of instructions in said emulated instruction set comprising an operator and an operand addressor sufficient to directly obtain an operand without further indirection;
second store means having a plurality of locations corresponding respectively with permissible combinations of said operator and said operand addressor and being adapted to hold at each of said locations a string of instructions selected from said host instruction set; and
control means adapted to input in sequence to said processing means, instruction strings from locations in said second store means and operands directly obtained without performing indirect addressing to obtain said operands, said control means including jump table means having, for substantially each permissible combination of said operator and said operand addressor, an entry comprising the address of a corresponding location in said second store means.

7. A computer according to claim 6, wherein a last instruction in a string of instructions held at each location in the second store means comprises a jump instruction which causes a jump to an entry in said jump table corresponding to a next instruction in said series of instructions stored in said first store means.

8. A computer according to claim 6 or claim 7, wherein said control means addresses the jump table means via a base address plus a logical address and the computer further comprises means responsive to receipt by the computer of an interrupt signal for altering said base address, all entries in the jump table means corresponding to said altered base address plus said logical address containing a same address of a location in said second store means, said location in said second store means holding a string of instructions selection from said host instruction set for responding to said interrupt.

9. A computer according to claim 6, wherein said control means comprises means for maintaining an instruction pointer containing an address in said first store means of the next instruction in said series of emulated instructions to be executed and wherein the string of host instructions held at each location in said second store means includes an instruction to update the instruction pointer.

10. A computer according to claim 6, wherein said jump table means contains entries corresponding to pairs of certain operators which require no addressing mode, each of said locations in said second store means corresponding to each of said jump table entries containing a host instruction string which emulates both of the said operators.

11. A computer according to claim 6, wherein the control means comprises means for storing at least part of a result of a computer operation affecting a flag function and wherein the host instruction string held at each location in the second store means corresponding to a combination of operator and addressing mode logically dependent upon said flag function comprises one or more host instructions adapted to derive a new value of said flag function from said stored result.

12. A computer according to claim 6, wherein certain instructions stored in said first store means at locations to which jumps are made in response to interrupt instructions from said set of emulated instruction, comprise pseudo-emulated instructions and the corresponding jump table means entry comprises an address in said second store means of a host instruction string adapted to perform an interrupt function.

13. Apparatus for operating a first computer from a plurality of first instructions, each of which is taken from an instruction set for a second computer different from said first computer, each of said first instructions starting with an operation code composed of a first predetermined number of bytes, said apparatus comprising:
a first store for storing said plurality of first instructions;
a second addressable store;
means for loading said second addressable store with groups of second instructions designed for use with the first computer, each of said instruction groups corresponding to a least one first instruction in said plurality of instructions;
means for reading a second predetermined number of bytes from said first store, said second predetermined number of bytes being greater than the first predetermined number of bytes in said operation code and including operand addressor information sufficient to directly obtain an operand without further indirection for at least one operand;
means responsive to the second predetermined number of bytes for accessing said second store to select a group of instructions from said instruction set; and
means responsive to said selected group of instructions for executing said selected group of instructions and for directly obtaining said operand without performing indirect addressing to obtain said operand.

14. Apparatus for operating a first computer with instructions designed for a second computer according to claim 13 wherein said accessing means comprises a third addressable store having a plurality of entries located at addresses corresponding to all combinations of said second predetermined number of bytes used by said second computer, each of said entries being an address of said second store at which a corresponding group of second instructions is located.

15. Apparatus for operating a first computer with instructions designed for a second computer according to claim 14 wherein said first computer comprises a central processing unit and a main memory and said first store, second addressable store and third addressable each comprise a segment of said main memory.

16. Apparatus for operating a first computer with instructions designed for a second computer according to claim 13 wherein said means for reading a second predetermined number of bytes from said first store comprises a pointer register.

17. Apparatus for operating a first computer with instructions designed for a second computer according to claim 13 wherein said first predetermined number of bytes is one and said second predetermined number of bytes is two.

18. Apparatus for operating a first computer with instructions designed for a second computer according to claim 13 wherein said first computer comprises a central processing unit and a main memory and said first store and said second addressable store each comprise a segment of said main memory.

19. Apparatus for operating a first computer with instructions designed for a second computer according to claim 13 wherein said first computer comprises means for receiving a program interrupt and wherein said accessing means comprises:
   a third addressable store having a plurality of entries located at addresses corresponding to all combinations of said second predetermined number of bytes used by said second computer, each of said entries being an address of said second store at which a corresponding group of second instructions is located;
   a fourth addressable store having a plurality of entries located at addresses corresponding to all combinations of said second predetermined number of bytes used by said second computer, each of said entries being an address of said second store at which a single group of second instructions for handling said program interrupt is located; and
   means responsive to a received program interrupt and to said second predetermined number of bytes for causing said fourth addressable store to be accessed to generate an address for accessing said second addressable store.

20. A method for operating a first computer, using a first processor type, from a plurality of first instructions, each of which is selected from among an instruction set native to a second computer using a second processor of a type different from that used by said first computer, each of said first instructions starting with an operation code composed of a first predetermined number of bytes and a substantial number of said first instructions including addressing mode information, said method comprising the steps of:
   A. storing said plurality of first instructions in a first store;
   B. loading sequences of instructions in an instruction set native to said first computer into a second addressable store, each of said sequences corresponding to at least one first instruction in said instruction set native to said second computer, there being for a substantial number of the operation codes in the instruction set native to said second computer a plurality of sequences of instructions in said second addressable store corresponding respectively to consistent combinations of said operation code and different addressing modes;
   C. reading a second predetermined number of bytes from said first store, said second predetermined number of bytes being greater than the first predetermined number of bytes in said operation code, and some first instructions including all addressing information necessary to directly perform said operation on an operand;
   D. using the bytes read in step C to address said second addressable store to select a sequence of instructions stored therein;
   E. executing the instruction sequence selected in step D in said first computer directly on said operand; and
   F. repeating steps C through E until all first instructions in said first store have been executed.

21. A method for operating a first computer with instructions designed for a second computer according to claim wherein step D comprises the steps of:
   D1. translating the bytes read in step C from the first store into an address suitable for accessing the second addressable store; and
   D2. accessing the second addressable store to read a first instruction from the selected sequence of instructions from the second addressable store.

22. A method for operating a first computer with instructions designed for a second computer according to claim 21 wherein step D1 comprises the step of:
   D1A. translating the bytes read in step C from the first store into an address suitable for accessing the second addressable store by accessing a jump table.

* * * * *